(12) United States Patent
Muench

(10) Patent No.: US 9,049,339 B2
(45) Date of Patent: Jun. 2, 2015

(54) METHOD FOR OPERATING A CONFERENCE SYSTEM AND DEVICE FOR A CONFERENCE SYSTEM

(71) Applicant: Harman Becker Automotive Systems GmbH, Karlsbad (DE)

(72) Inventor: Tobias Muench, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 137 days.

(21) Appl. No.: 13/744,114

(22) Filed: Jan. 17, 2013

(65) Prior Publication Data

US 2013/0182064 A1 Jul. 18, 2013

(30) Foreign Application Priority Data

Jan. 18, 2012 (EP) ..................................... 12000341

(51) Int. Cl.
*H04N 7/14* (2006.01)
*H04N 7/15* (2006.01)
*H04M 3/56* (2006.01)
*H04S 5/00* (2006.01)
*H04R 1/40* (2006.01)
*H04S 7/00* (2006.01)

(52) U.S. Cl.
CPC ................. *H04N 7/15* (2013.01); *H04M 3/568* (2013.01); *H04N 7/152* (2013.01); *H04R 1/406* (2013.01); *H04M 2203/5072* (2013.01); *H04S 5/00* (2013.01); *H04S 7/303* (2013.01); *H04S 2400/11* (2013.01); *H04S 2420/01* (2013.01)

(58) Field of Classification Search
USPC ........................................... 348/14.01–14.09
See application file for complete search history.

(56) References Cited

U.S. PATENT DOCUMENTS

| 5,335,011 | A | * | 8/1994 | Addeo et al. ................. 348/14.1 |
| 8,503,655 | B2 | * | 8/2013 | Sandgren et al. ........ 379/202.01 |
| 2003/0081115 | A1 | * | 5/2003 | Curry et al. ................ 348/14.12 |
| 2004/0247144 | A1 | * | 12/2004 | Nelson et al. ................. 381/300 |
| 2006/0274733 | A1 | * | 12/2006 | Mussman et al. ............. 370/352 |

FOREIGN PATENT DOCUMENTS

| WO | 9416517 A1 | 7/1994 |
| WO | 2008143561 A1 | 11/2008 |
| WO | WO2008143561 A1 | 11/2008 |

OTHER PUBLICATIONS

European Search Report for Application No. 12000341.3, mailed Jul. 4, 2012, 6 pages.

(Continued)

*Primary Examiner* — Maria El-Zoobi
(74) *Attorney, Agent, or Firm* — Brooks Kushman P.C.

(57) ABSTRACT

A device for a conference system and method for operation thereof is provided. The device is configured to receive a first audio signal and a first identifier associated with a first participant. The device is further configured to receive a second audio signal and a second identifier associated with a second participant. The device includes a filter configured to filter the received first audio signal and the received second audio signal and to output a filtered signal to a number of electroacoustic transducers. The device includes a control unit connected to the filter. The control unit is configured to control one or more first filter coefficients based on the first identifier and to control one or more second filter coefficients based on the second identifier. Preferably the device comprises a headtracker function for changing the first and second filter coefficients depending on tracking of head's position.

16 Claims, 2 Drawing Sheets

(56) References Cited

OTHER PUBLICATIONS

Allen et al., "Image method for efficiently simulating small-room acoustics", Acoustics Research Department, Bell Laboratories, Murray Hill, NJ, Jun. 6, 1978, 8 pages.

Diesenreiter et al., "Convolution: Faltung in der Studiopraxis", SAE, Wien, 2005, 37 pages.

European Search Report for corresponding European Application No. 12000341.3, mailed Jul. 4, 2012, 6 pages.

\* cited by examiner

METHOD FOR OPERATING A CONFERENCE SYSTEM AND DEVICE FOR A CONFERENCE SYSTEM

CROSS-REFERENCE TO RELATED APPLICATIONS

This application claims the benefit of EP Application No. 12000341.3-1241 filed on Jan. 18, 2012, the disclosure of which is incorporated in its entirety by reference herein.

TECHNICAL FIELD

The present invention concerns a method for operating a conference system and a device for a conference system.

BACKGROUND

Video conferencing devices are known from "Empfehlungen zur Vor-bereitung einer Videokonferenz" ["Recommendations for preparing a video conference"], July 2008, Kompetenzzentrum far Videokonferenzdienste, Technical University Dresden. The ITU-T Standard (Telecommunication Standardization Sector) H.323 for IP transmissions defines audio and video standards for video conferencing systems. Audio standards implemented in video conferencing systems are: G.711, G.722, G.722.1 Annex C (Polycom Siren 14), G.723.1, G.728 and G.729. As video standards, H.261, H.263, H.263+, H.263++ and H.264 are implemented.

The video conferencing terminals that are used are divided into the following four major system classes: personal systems, office systems, group systems, and room systems. Desktop or personal systems are video conferencing systems for personal computers (PCs) and laptops. These software-based solutions are used with a USB camera and a headset (headphone/microphone unit). Moreover, cameras can also be connected through a video card integrated in the PC.

Desktop systems are designed for individual users. In addition to their low cost in comparison to all the other classes, these systems offer the advantage that the user has full access during the video conference to his data and the programs installed on his PC. Compact systems represent fully integrated video communications solutions. Generally, the only additional requirements for operating them are a monitor and the appropriate network connections (integrated services digital network (ISDN) and/or local area network (LAN)). The conference system and camera constitute a closed unit.

Room systems are video communications solutions with a modular design. Flexible system configurations for nearly every application are made possible by adaptable equipment properties. Cameras, room microphones, and large monitors allow these systems to be integrated into even large conference rooms, and these systems naturally also allow for the integration of various peripheral equipment such as, for example, document cameras. Room systems make it possible for mid-sized to large groups of people to participate in video conferences.

The use of convolution in acoustics is known from "Convolution: Faltung in der Studiopraxis" ["Convolution: use in studios"], Philipp Diesenreiter, SAE Vienna 2005. The increasing computing power of special digital signal processors (DSPs) and the home computer permits the use of convolution in sound studios. When one excites a room with a short (broadband) pulse, one hears an echo that is characteristic for this room and that emphasizes or damps specific frequency components of the pulse as a result of the room's geometry and dimensions, its basic structure, its interior, and other specific characteristics. If the echo is now recorded, one thus obtains the impulse response of this room. The impulse response contains the complete characteristic of the (linear) room. In the technique of convolution, this impulse response is now utilized in order to combine any other desired acoustic signals with the impulse response through the mathematical process of convolution. For example, a discrete, fast convolution Fast Fourier Transformation (FFT) for discrete (digitized) periodic signals is used to generate the acoustic characteristic of the room. As an alternative to determining impulse responses for a specific room, the impulse response can also be obtained through modeling, such as ray tracing and the source image model.

When a room is bounded by flat surfaces, the reflected sound components can be calculated by means of the source image method by constructing mirror-image sound sources. By means of the modeling, it is possible to alter the position of the sound source and thus generate a new impulse response. By means of the impulse response, a signal for reproduction is faded out using an associated filter. The spatial impression is the auditory perception that one receives from the room itself when a sound event occurs. The spatial impression augments the acoustic information that comes directly from the sound source with important information about the environment, about the size and character of the room. The spatial impression consists of multiple components: the perception of the width and depth of the room, which is to say of the room size; the perception of liveness, which prolongs each sound event and fuses it with the following one; and the perception of space. Digital filters are one of the most important tools of digital signal processing. One implementation of a filter is achieved using convolution. This type of filter is called a Finite Impulse Response (FIR) filter.

Using digital filters is known from "Image method for efficiently simulating small-room acoustics", J. B. Allen and D. A. Berkley, J. Acoust. Soc. Am. 65(4), April 1979. Image techniques for simulating on a digital computer the impulse response between two points in a small rectangular room are used theoretically and practically.

SUMMARY

The object of the invention is to improve a method for operating a conference system.

This object is attained by a method for operating a conference system with the features of independent claim 1. Advantageous refinements are contained in the description.

Accordingly, a method for operating a conference system is provided. A first sound of a first participant is transformed into a first audio signal by means of a first microphone. A second sound of a second participant is transformed into a second audio signal by means of a second microphone.

In the method, a first identifier associated with the first participant is generated when the first participant produces the first sound, for example in that the first participant speaks into the first microphone.

In the method, a second identifier associated with the second participant is generated when the second participant produces the second sound as for example by speaking. More particularly, the first participant and the second participant are in different locations and are linked with one another through a connection such as an Internet connection or a telephone connection.

In the method, the first audio signal and the second audio signal and the first identifier and the second identifier are transmitted to a device of a further participant, as for example, over telephone connection or over Internet connection.

In the method, the transmitted first and second audio signals are filtered by a filter of the device. An output signal (filtered signal) of the filter is optionally amplified. The output signal is a stereo signal or multichannel signal, (e.g. four channels). The device is connectable to a number of electroacoustic transducers to playback the filtered signal. An electroacoustic transducer is, for example, a loudspeaker, headphone or an earphone.

One or more first filter coefficients of the filter are associated with the first identifier and one or more second filter coefficients of the filter are associated with the second identifier. First and second filter coefficients are different causing an acoustic separation of the first and second participants in a virtual acoustic space.

As a result of the separation of the first and second participants in the virtual acoustic space, the intelligibility and association of the spoken utterances during a telephone conference or video conference can be improved significantly, as will be explained in embodiments according to the figures.

The invention has the additional object of improving a device for a conference system.

This object is attained by the device with the features of independent claim 2. Advantageous refinements are the subject matter of dependent claims and are contained in the description.

Accordingly, a device for a conference system, more especially for a telephone conference system or a video telephone conference system, is provided. The device is configured to receive a first audio signal and a second audio signal and a first identifier associated with a first participant and a second identifier associated with a second participant (e.g. via telephone connection or internet connection).

The device is connectable to a number of electroacoustic transducers. For example, the device has a first port for connection of a first electroacoustic transducer and a second port for connection of a second electroacoustic transducer. The device has a filter configured to filter the received first audio signal and the received second audio signal and to output a filtered signal. The filtered signal is optionally amplified for playback by the electroacoustic transducers. The filter is preferably a digital filter, as for example, a FIR filter.

The device has a control unit connected to the filter. The control unit preferably has, for example, a computing unit, such as a processor or a microcontroller. The control unit is configured to control one or more first filter coefficients based on the received first identifier of the first participant and to control one or more second filter coefficients based on the received second identifier of the second participant. The first and second filter coefficients are different thereby causing an acoustic separation of the first and second participants in a virtual acoustic space.

The embodiments described below relate both to the device and to the method for operating a conference system.

The received first audio signal and the received second audio signal are separated in the virtual acoustic space. This can also be called spatialization. In this case, there are several possibilities for separation. For example, the first audio signal can be reproduced exclusively by at least one first electroacoustic transducer, whereas simultaneously, the second audio signal is reproduced exclusively by at least one second electroacoustic transducer. In this case, the distance of the arrangement of the first loudspeaker and of the second loudspeaker furthermore forms the distance between a first location of the first audio signal and a second location of the second audio signal in the virtual acoustic space.

In another embodiment, more than two audio signals are output over at least two electroacoustic transducers arranged at a distance from one another. The audio signals are reproduced by both electroacoustic transducers at a different volume by the filtering (i.e., further left or further right in the virtual acoustic space). In addition, an audio signal can be reproduced in the middle by the filtering (i.e., played back by both electroacoustic transducers at the same volume). This separation in the virtual acoustic space in several intermediate positions between far left and far right is also called panning.

In another embodiment, the first audio signal and the second audio signal are arranged in different spatial depths of the virtual acoustic space by the filtering. The virtual acoustic space is preferably a virtual acoustic room, whereas the filtering takes into account reflections at virtual walls of the virtual acoustic room. For this purpose, convolution is used in that the first audio signal and the second audio signal are filtered with different filter coefficients. For example, a Finite Impulse Response (FIR) filter, sometimes also called a transversal filter, is used for the convolution. The location of each audio signal can be positioned as desired in the virtual acoustic room by means of the filter parameters, especially by the convolution. Preferably, a number of first filter coefficients is loaded in a first filter block of a filter for filtering for the first location and a number of second filter coefficients is loaded in a second filter block of a filter for the second location. In this case, the location in the virtual acoustic room is the source position at which the listener locates the corresponding audio signal acoustically.

According to a preferred embodiment, the first filter coefficients are associated with a first impulse response of the filter for a first position in a virtual acoustic room. The second filter coefficients are associated with a second impulse response of the filter for a second position in the virtual acoustic room. The first and second impulse responses preferably apply for the same acoustic room, where the first impulse response is associated with a first position in the acoustic room as the virtual location of the first sound source of the first participant, and the second impulse response is associated with a second position in the acoustic room as the virtual location of the second sound source of the second participant.

According to another embodiment, the device is configured to ascertain a change of a head position. This can be called head tracking The device is configured to change the one or more first filter coefficients and/or the one or more second filter coefficients based on the ascertained change of the head position. Preferably the device is configured to change the one or more first filter coefficients and/or the one or more second filter coefficients to shift the first position of the first participant and second position of the second participant in the virtual acoustic space by the same angle as the change of the head position. The shifting causes that locations of virtual sound sources of the first participant and the second participant to remain unchanged independent of the change of the head position.

In an especially advantageous embodiment, the device has an additional port for connection of a camera. For example, a video of the further participant is recorded by means of the camera and transmitted to the other participants as appropriate. The device is configured to detect the change in position of the head of the further participant, in particular to ascertain an angle of rotation.

In another embodiment, the device has an additional port for connection of a display. The display is implemented, for example, as a screen or as a touch screen where the touch screen allow inputs to be made. The device is preferably configured to receive first visual data (e.g. video of the first participant and visual data and a photo or screen presentation of the second participant).

The device preferably is configured to output the first visual data of the first participant in a first object and the second visual data of the second participant in a second object in the display. The object is, for example, a two-dimensional frame or a 3D object.

Preferably, the device is configured to arrange the positions of the first and second objects in the display based on the acoustic separation of the first and second participants in the virtual acoustic space. In advantageous fashion, the positions in the virtual acoustic space and the positions of the objects correspond to one another. For instance, if the first participant is heard from the left and the second participant is heard from the right, then the first object is displayed to the left of the second object.

The embodiments described above are especially advantageous, both individually and in combination. All embodiments may be combined with one another. Some possible combinations are explained in the description of the exemplary embodiments from the figures. However, these possibilities of combinations of the embodiments introduced there are not exhaustive.

The invention is explained in detail below through exemplary embodiments and with reference to drawings.

BRIEF DESCRIPTION OF THE DRAWINGS

They show.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
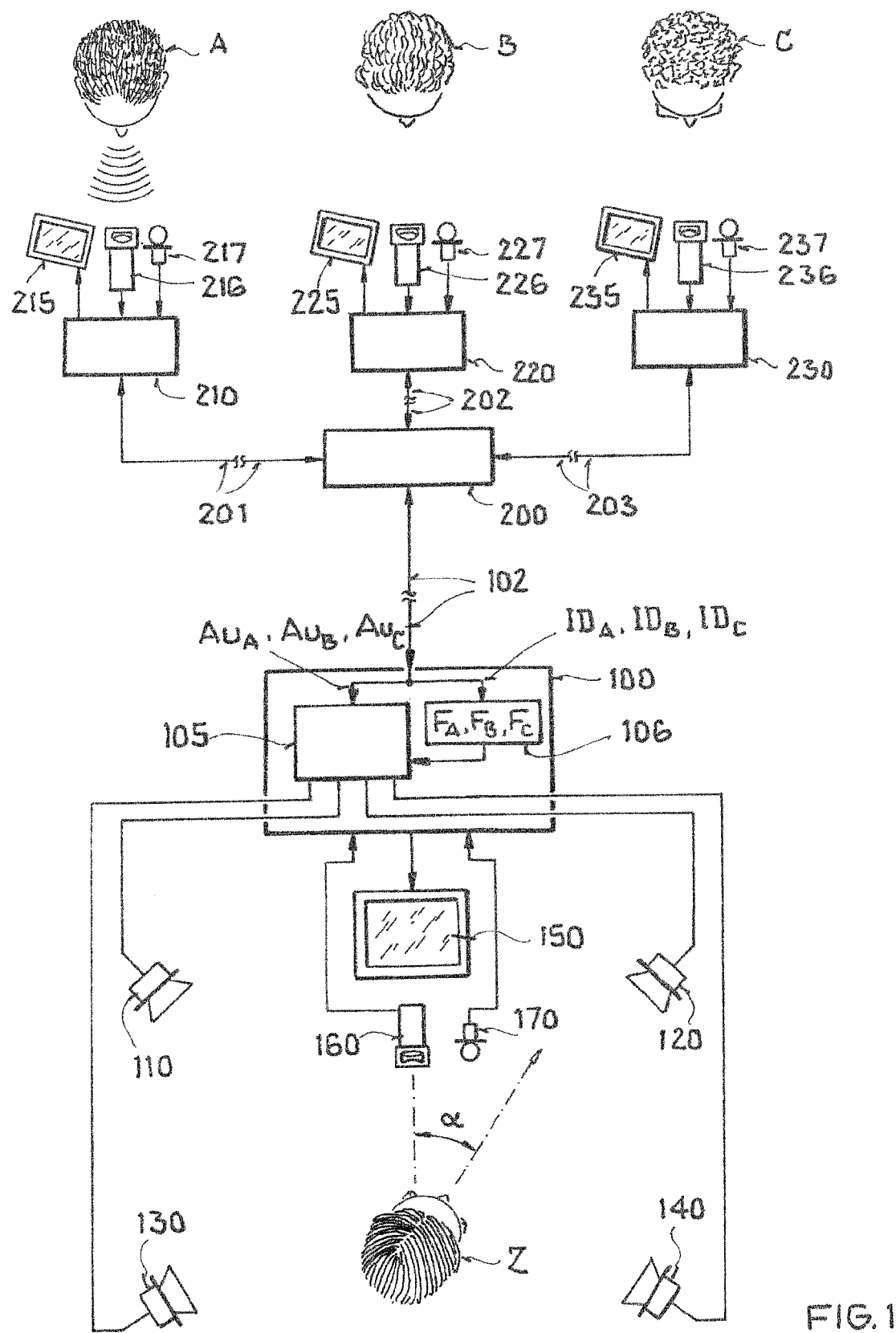
FIG. 1 an exemplary embodiment of a video conference system,
FIG. 2 a schematic representation of a virtual acoustic room, and
FIG. 3 a schematic representation of a display.

FIG. 1 shows multiple components for implementing multipoint video conferences. The components form a video conferencing system and the individual components are explained below. H.323 is a standard from the International Telecommunication Union (ITU), and describes all protocols and standards for voice, data, and video communication over packet-oriented networks. The standard defines four main groups: Terminals 210, 220, 230, Gateways, Gatekeepers, and Multipoint Control Units. For the purpose of a simpler representation, FIG. 1 shows three terminals 210, 220, 230 and one multipoint control unit in the function block 200.

The term "terminal" is used to describe all commercial video conferencing equipment such as desktop systems, compact systems, and room systems. In the exemplary embodiment from FIG. 1, a display 215, 225, 235, a camera 216, 226, 236, and a microphone 217, 227, 237 are connected to each terminal 210, 220, 230. A first participant A communicates through the first terminal 210. A second participant B communicates through the second terminal 220. A third participant C communicates through the third terminal 230. The terminals 210, 220, 230 are connected to the Multipoint Control Unit through connections 201, 202, 203, for example wired connections or radio connections.

The Multipoint Control Unit is a star distributor for group conferences. The Multipoint Control Unit is a hardware and/or software solution that manages and controls one or more multipoint conferences. In the exemplary embodiment from FIG. 1, the function block 200 has a gatekeeper in addition to the Multipoint Control Unit. The gatekeeper is a hardware and/or software solution for routing call signaling, resolving telephone numbers and IP addresses, and converting said numbers and addresses.

Not shown in FIG. 1 is a gateway, which implements the connection between the IP network (H.323) and the telephone network (H.320) in both directions for video conferences in that it performs protocol conversion from ISDN to IP and back.

In FIG. 1, four geographically separated participants A, B, C and Z are carrying out a videoconference with one another. All participants A, B, C and Z are in different locations for the videoconference. In this scenario, all devices must be logged in at the function block 200 (Multipoint Control Unit/Gatekeeper).

For example, first participant A is using a compact system. This video conferencing system has a modular structure, which is to say it consists of a codec with a separate camera 216. A TV monitor 215, for example, can be used for the video and audio reproduction. Second participant B is using a desktop system. This software client can be used over a LAN connection at the workstation with a USB camera 226, a monitor 225 and a headset. A room system is available to the third participant C. The modular room system is connected to camera 236, microphone 237, screen 235 and loudspeakers.

The video and audio data streams from all participant systems are processed in the Multipoint Control Unit of the function block 200. A new video data stream is generated from the incoming video data streams and is sent back to all participants A, B, C, Z. In FIG. 1, the presentation of the video conference takes place in continuous presence mode, for example. In this mode, all conference participants A, B, C, Z see one another simultaneously and can all hear one another. The function block 200 receives the video image of all participants A, B, C, Z and transmits back to the terminals video streams individually transcoded in accordance with the display capacity of the terminals. The incoming audio streams $Au_A$, $Au_B$, $Au_C$ are processed in the function block 200 in that the audio streams $Au_A$, $Au_B$, $Au_C$ of the participants A, B, C are mixed. In addition, the function block 200 ascertains which participant A, B, C is speaking at the moment, and an identifier $ID_A$, $ID_B$, $ID_C$ of the applicable participant A, B, C is transmitted along with the audio streams by the Multipoint Control Unit of the function block 200.

When the video conference is carried out in voice switching mode, only the participant A, B, C who is currently speaking is seen by all the other conference participants A, B, C, Z. The Multipoint Control Unit of the function block 200 transmits the video of the participant who is currently speaking—participant A in the case shown in FIG. 1—back to all conference participants A, B, C, Z e.g. in full-screen display. The audio streams $Au_A$, $Au_B$, $Au_C$ received by the Multipoint Control Unit are first mixed or switched among one another and then are transmitted back to all participants A, B, C, Z.

In the exemplary embodiment from FIG. 1, the case is shown in which the further participant Z is receiving a first audio signal $Au_A$ from the first participant A, a second audio signal $Au_B$ from the second participant B, and a third audio signal $Au_C$ from the third participant C. The audio signals $Au_A$, $Au_B$ and $Au_C$ are mixed in the function block 200. In addition, when the first participant A speaks, a first identifier $ID_A$ is transmitted, when the second participant B speaks, a second identifier $ID_B$ is transmitted, and when the third participant C speaks, a third identifier $ID_C$ is transmitted to the device 100 of the further participant Z through the connection 102.

The device 100 of the further participant Z is designed for connection of a number of electroacoustical transducers (or loudspeakers) 110, 120, 130, 140. Preferably, a number of at least two electroacoustical transducers are connectable. Generally, 2 to N loudspeakers could be used. In FIG. 1 a first loudspeaker 110, a second loudspeaker 120, a third loudspeaker 130 and a fourth loudspeaker 140 are connected. The first loudspeaker 110 and the second loudspeaker 120 are positioned in front of the further participant Z. In contrast, the third loudspeaker 130 and the fourth loudspeaker 140 are positioned, for example, behind the further participant Z. A four-loudspeaker arrangement of this nature is possible, for example, in a motor vehicle. In addition, the device 100 of the further participant Z is designed for connection of a camera 160, for connection of a microphone 170, and for connection of a display 150.

The device 100 of the further participant Z has a filter 105 for filtering the received first audio signal $Au_A$, and the received second audio signal $Au_B$. In addition, the device 100 has a control unit 106 connected to the filter 105 in order to control a quantity of—that means one or more—first filter coefficients $F_A$ and a quantity of second filter coefficients $F_B$ and a quantity of third filter coefficients $F_C$ of the filter 105. The control unit 106 is configured to control one or more first filter coefficients $F_A$ based on the received first identifier $ID_A$ of the first participant A, to control one oremore of second filter coefficients $F_B$ based on the received second identifier $ID_B$ of the second participant B, and to control one or more of third filter coefficients $F_B$ based on the received third identifier $ID_C$ of the third participant C.

In this context, the conference system shown in FIG. 1 carries out a method in that a first sound of the first participant A is converted into the first audio signal $Au_A$ by means of the first microphone 217. Also, a second sound of the second participant B is converted into the second audio signal $Au_B$ by means of the second microphone 227. The same applies analogously to the third participant C. In addition, the function block 200 generates the first identifier $ID_A$ associated with the first participant A when the first participant A produces the first sound, for example when A speaks or the like. Moreover, the second identifier $ID_B$ associated with the second participant B is generated when the second participant B produces the second sound. Moreover, the third identifier $ID_C$ associated with the third participant C is generated when the third participant C produces the third sound.

The audio signals $Au_A$, $Au_B$, $Au_C$ and the identifiers $ID_A$, $ID_B$, $ID_C$ are transmitted to the further participant Z. A spatialization technique is used to output the audio signals $Au_A$, $Au_B$, $Au_C$ in different locations in a virtual acoustic space for the further participant Z. The four loudspeakers 110, 120, 130, 140 in FIG. 1 play back the filtered signal output from the filter 105. The loudspeakers 110, 120, 130, 140 shown in FIG. 1, for example, are active loudspeakers 110, 120, 130, 140. Alternatively, an additional power amplifier can be provided for each loudspeaker 110, 120, 130, 140.

The quantity of first filter coefficients $F_A$ of the filter 105 are associated with the first identifier $ID_A$. The quantity of second filter coefficients $F_B$ of the filter 105 are associated with the second identifier $ID_B$. The quantity of third filter coefficients $F_C$ of the filter 105 are associated with the third identifier $ID_E$. The first, second, and third filter coefficients $F_A$, $F_B$, $F_C$ are different for the purpose of acoustic separation of the first, second, and third participants A, B, C in a virtual acoustic space. As shown schematically in the embodiment of FIG. 2, virtual acoustic space is a virtual acoustic room 1. In this way, each participant A, B, C is placed in the virtual acoustic room 1 in that the further participant Z hears the other participants A, B, C by filtering.

Figure 2:
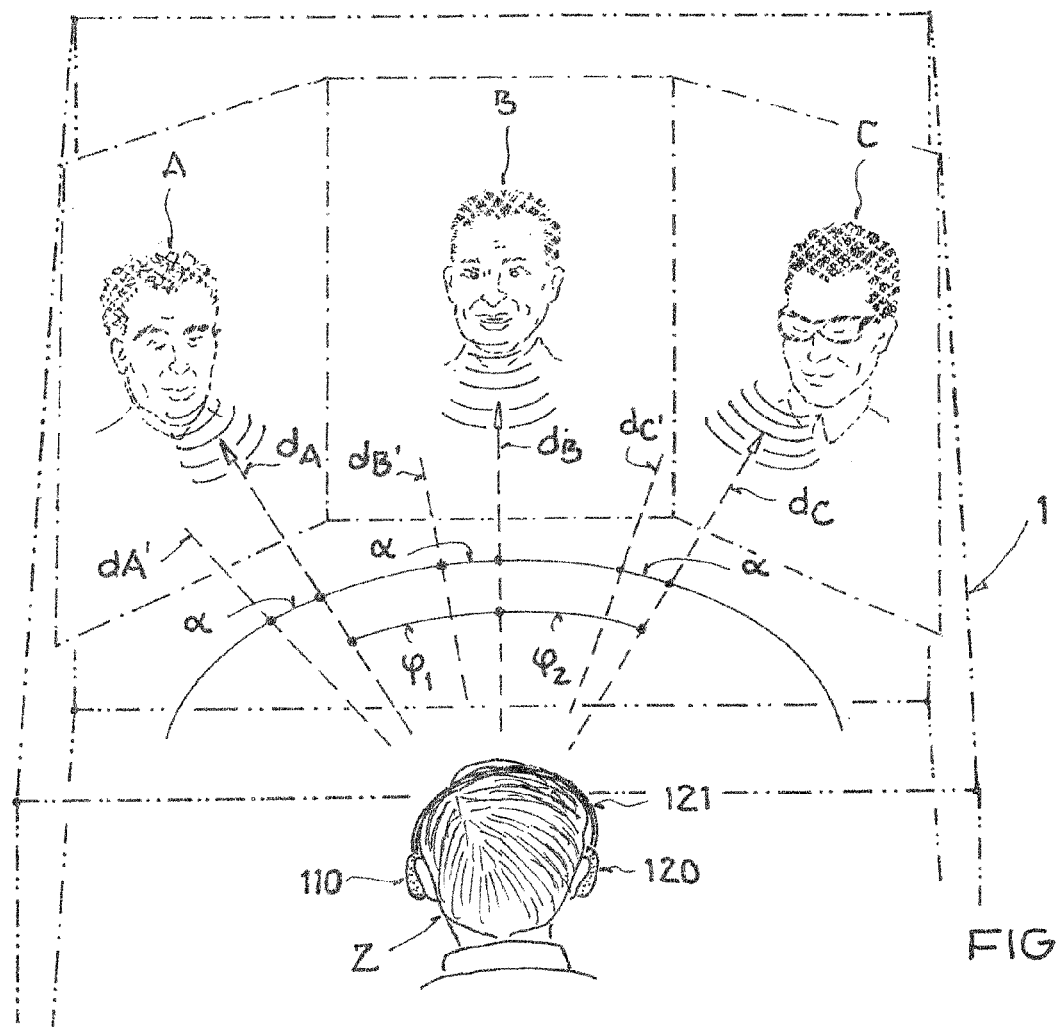

In the embodiment of FIG. 2, an acoustic room model is created by means of an acoustic room simulation, as for example by means of the source image method or ray tracing. In the embodiment of FIG. 2, the acoustic room model is implemented for headphones 121 having a first electroacoustical transducer 110 for the left ear and a second electroacoustical transducer 120 for the right ear. This is also called binaural technique. The participants A, B, C are virtually placed as sound sources in the acoustic room model. Depending on the number of participants, they can be placed suitably close to or distant from one another acoustically. The direct sound and reflections of the sound sources from walls, ceiling and floor of the virtual acoustic room 1 are calculated by means of the room simulation and using head related transfer functions (HRTFs) so that impulse responses result, which, by means of the filter 105, produce an acoustic impression as though the further participant Z would sit in precisely this simulated room and hears the participants A, B, C at exactly the spots in the virtual acoustic room 1 where the virtual sound sources are placed (e.g., left front, back center, right front, etc.).

The different impulse responses for the different placements in the virtual acoustic room 1 are now used in the filter 105 to filter the received audio signal $Au_A$, $Au_B$, $Au_C$. This is accomplished through FIR filtering, fast convolution, or segmented fast convolution or the like. Alternatively, a displacement in the stereo panning takes place as filtering, in that, for example, the first participant A is placed to the far left in the stereo panorama and the second participant B is placed to the far right in the stereo panorama through different volume levels. In contrast, if a relatively large number of participants is included in the conference, a virtual acoustic room 1—as shown in FIG. 2—with reflections is more suitable for acoustically separating the plurality of participants A, B, C in the virtual acoustic room 1.

If the conference system detects that the first participant A is speaking, the first filter coefficients $F_A$ are used, and in the exemplary embodiment of FIG. 2 for the listener Z, that means the further participant Z hears the first participant A from the left front, from the first direction $d_A$. The participants A, B, C are schematically represented here as virtual acoustic sources in the virtual acoustic room 1. When the second participant B speaks, the second filter coefficients $F_B$ are used and the listener Z hears the second participant B from the center, from the second direction $d_B$. When the third participant C speaks, the listener Z hears the third participant C from the third direction $d_C$. The first and second directions $d_A$, $d_B$ are separated from one another by the angle $\phi_1$ here. The second and third directions $d_B$, $d_C$ are separated from one another by the angle $\phi_2$ here. If the first participant A and the second participant B speak at the same time, the mixture of voices is not separated, and is either positioned in accordance with the last identifier, or is given a new position, for example in an intermediate position in the virtual acoustic room 1.

The binaural technique shown in FIG. 2 is significantly improved in that it is combined with head trackers. The camera 160 shown in FIG. 1 of the further participant Z is used in synergy here, both for recording a video image of the further participant Z and for a face tracking algorithm that performs the function of a head tracker. Using face tracking, the position of the head, in particular the horizontal angle of rotation of the head of the further participant Z is detected. In the exemplary embodiment of FIG. 2, the head of the further participant Z is rotated horizontally through the angle $\alpha$. In the exemplary embodiment from FIG. 2, the detected angle of rotation a of the head is used to control the filter 105 so that the sound sources of the participants A, B, C in the virtual acoustic room 1 are changed on the basis of the detected angle of rotation a of the head.

When the angle of rotation a of the head is ascertained, the filter 105 is preferably controlled such that the sound sources of the participants A, B, C remain in a fixed location in the virtual acoustic room 1 even when the listener Z turns his head. If, in the exemplary embodiment from FIG. 2, the listener Z turns his head by the angle $\alpha$, the directions $d_A$, $d_B$ and $d_C$ are likewise displaced in the opposite direction by the angle $\alpha$ to the directions $d_A'$, $d_B'$, $d_C'$. The use of head tracking achieves the advantage that the acoustical plausibility is improved significantly. In addition, head tracking can be used to ascertain the direction of speech of the further participant Z and to transmit appropriate directional information with an identifier to the other participants A, B, C.

The exemplary embodiments in FIGS. 1 and 2 make it possible to acoustically process telephone conferences for passengers Z, for example, in the back seats of a motor vehicle in order to facilitate improved differentiation when there are multiple participants A, B, C. The exemplary embodiments in FIGS. 1 and 2 achieve the advantage that identification by the listener Z of that participant A, B, C who is currently speaking is improved. A filtered signal is produced here from the transmitted monaural audio signal by dependent controlled filtering. In this way, the speakers are acoustically separated and are distributed in the virtual acoustic space/room 1 so that they can be distinguished clearly by the listener Z. As a result, it is no longer difficult for the listener Z to tell the participants A, B, C apart by their voices alone, even when the voices of the participants A, B, C sound similar, or when the listener Z does not know the participants A, B, C very well. By means of the identifiers $ID_A$, $ID_B$, $ID_C$, the speaking participant A, B, C is automatically recognized by the conference system, which is used for acoustic separation in the exemplary embodiments in FIGS. 1 and 2.

Figure 3:
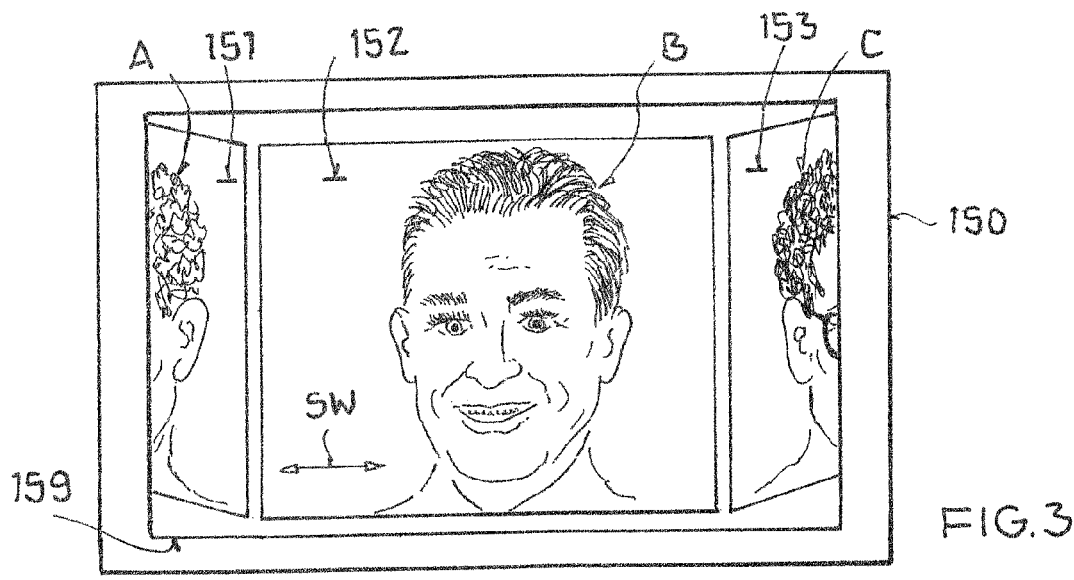

FIG. 3 shows an embodiment in which a visual positioning of the visual data of the applicable participant A, B, C takes place in a manner in accord with the positioning in the virtual acoustic space/room 1. The visual data are shown in a connected display 150. The control unit 106 is configured to receive first visual data such as, for example, video of the first participant A and second visual data such as, for example, video of the second participant B.

Shown in FIG. 3 is that by means of the display 150, the first visual data of the first participant A are displayed in a first object 151 and the second visual data of the second participant B are displayed in a second object 152. In addition, third visual data of the third participant C are displayed in a third object 153.

The objects in this example are positioned within the screen area 159 to accord with the positioning of the participants A, B, C in the virtual acoustic room 1 as shown in FIG. 2. Thus, the positions of the first object 151 and of the second object 152 are also arranged in the display 150 based on the acoustic separation of the first and second participants A, B in the virtual acoustic room 1. In the exemplary embodiment from FIG. 2, the second participant B is currently speaking, so the second visual data of the second participant B are displayed in the second object 152, with the second object 152 being shifted into the foreground. In contrast, the first object 151 and the third object 153 are in the background. If the identifier now changes so that the first identifier $ID_A$ of the first participant A is received, then the objects 151, 152, 153 are shifted, for example, along the pivot direction SW or three-dimensionally, so that the first visual data of the first participant A are displayed in the foreground by means of the first object 151. In this way, the advantage is achieved that, in addition, the visual impression for the listener Z corresponds to the binaural auditory impression, and easier understanding of the course of the discussion is made possible.

The invention is not restricted to the embodiments shown in FIGS. 1 through 3. For example, it is possible to provide a larger number of participants who are additionally tiered back-to-front in the virtual acoustic room 1. It is also possible to use a higher number of electroacoustical transducers (e.g. eight loudspeakers). The functionality of the device 100 can be used to especially good advantage for an audio system of a motor vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE CHARACTERS 1 virtual acoustic room
100 device
102, 201, 202, 203 connection
105 filter
106 control unit
110, 120, 130, 140 electroacoustical transducers, loudspeaker
150, 215, 225, 235 display
151, 152, 153 object
159 display area
160, 216, 226, 236 camera
170, 217, 227, 237 microphone
200 function block
210, 220, 230 terminal
A, B, C, Z participant
$Au_A$, $Au_B$, $Au_C$ audio signal
$ID_A$, $ID_B$, $ID_C$ identifier
$F_A$, $F_B$, $F_C$ filter coefficients
SW pivot direction
$d_A$, $d_A'$, $d_B$, $d_B'$, $d_C$, $d_C'$ direction
$\alpha$, $\phi_1$, $\phi_2$ angle

What is claimed is:

1. A method for operating a multipoint conference system, the method comprising:
    transforming a first sound of a first participant into a first audio signal by means of a first microphone;
    transforming a second sound of a second participant into a second audio signal by means of a second microphone;
    generating a first identifier associated with the first participant when the first participant produces the first sound;
    generating a second identifier associated with the second participant when the second participant produces the second sound;
    transmitting the first audio signal, the second audio signal, the first identifier, and the second identifier to a device of a further participant;

filtering the transmitted first audio signal and the second audio signal by a filter of the device;

associating one or more first filter coefficients of the filter with the first identifier and associating one or more second filter coefficients of the filter with the second identifier;

causing an acoustic separation of the first participant and the second participant in a virtual acoustic space with the one or more first filter coefficients and the one or more second filter coefficients, wherein the one or more first filter coefficients and the one or more second filter coefficients are different;

determining a change of a head position of the further participant;

changing the one or more first filter coefficients and/or the one or more second filter coefficients based on the change of the head position;

communicating, with the first participant through a first terminal;

communicating, with the second participant through a second terminal, wherein the first participant, the second participant, and the further participant are in different locations for a conference, and connecting the first terminal and the second terminal to a function block through connections of a packet-oriented network.

2. The method according to claim 1 further comprising
logging in the first terminal, the second terminal, and the device of the further participant at the function block;
providing a gatekeeper of the function block for routing call signaling, resolving telephone numbers and IP addresses; and
converting the telephone numbers and the IP addresses.

3. An apparatus for a conference system, the apparatus comprising:
a device configured to receive a first audio signal and a first identifier associated with a first participant from a first terminal and to receive a second audio signal and a second identifier associated with a second participant from a second terminal,
wherein the first terminal, the second terminal, and the device are in different locations for a conference;
wherein the device includes:
a filter of the device configured to filter the first audio signal and the second audio signal and to output a filtered signal to a number of electroacoustic transducers, and
a control unit connected to the filter, the control unit configured to control one or more first filter coefficients based on the first identifier and to control one or more second filter coefficients based on the second identifier,
wherein the first and second filter coefficients are different causing an acoustical separation of the first participant and the second participant in a virtual acoustic space; and
wherein the device is further configured to ascertain a change of a head position of a further participant and to change the one or more first filter coefficients and/or the one or more second filter coefficients based on the ascertained change of the head position.

4. The apparatus of claim 3 wherein the one or more first filter coefficients are associated with a first impulse response of the filter for a first position in a virtual acoustic room, and wherein the one or more second filter coefficients are associated with a second impulse response of the filter for a second position in the virtual acoustic room.

5. The apparatus of claim 3 wherein the device is further configured to change the one or more first filter coefficients and/or the one or more second filter coefficients shifting a first position of the first participant and a second position of the second participant in the virtual acoustic space by a same angle as the change of the head position in a direction opposite to the change of the head position such that locations of virtual sound sources of the first participant and the second participant remain unchanged independent of the change of the head position.

6. The apparatus of claim 3 wherein the device is further configured to connect a camera and to ascertain the change of the head position based on image data of the camera.

7. The apparatus of claim 3 wherein the device is further configured to:
connect to a display;
receive first visual data of the first participant and second visual data of the second participant;
output the first visual data of the first participant in a first object and the second visual data of the second participant in a second object in the display, and
arrange a position of the first object and a position of the second object in the display based on the acoustic separation of the first participant and the second participant in the virtual acoustic space.

8. An apparatus for a multipoint conference system, the apparatus comprising:
a device configured to:
receive a first audio signal and a first identifier associated with a first participant from a first terminal;
receive a second audio signal and a second identifier associated with a second participant from a second terminal;
filter the first audio signal and the second audio signal to output a filtered signal to at least one electroacoustic transducer,
control one or more first filter coefficients based on the first identifier; and
control one or more second filter coefficients based on the second identifier; the one or more first filter coefficients being different from the one or more second filter coefficients thereby causing an acoustical separation of the first participant and the second participant in a virtual acoustic space;
wherein the first terminal, the second terminal, and the device are in different locations for a conference; and
wherein the device is further configured to determine a change of a head position of a further participant and to change the one or more first filter coefficients and/or the one or more second filter coefficients based on the change of the head position.

9. The apparatus of claim 8 wherein the device includes a filter for filtering the first audio signal and the second audio signal.

10. The apparatus of claim 9 wherein the one or more first filter coefficients are associated with a first impulse response of the filter for a first position in the virtual acoustic space, and wherein the one or more second filter coefficients are associated with a second impulse response of the filter for a second position in the virtual acoustic space.

11. The apparatus of claim 8 wherein the device is further configured to change the one or more first filter coefficients and/or the one or more second filter coefficients shifting a first position of the first participant and a second position of the second participant in the virtual acoustic space by a same angle as the change of the head position in a direction opposite to the change of the head position such that locations of virtual sound sources of the first participant and the second participant remain unchanged independent of the change of the head position.

12. The apparatus of claim 8 wherein the device is operably coupled to a camera and is further configured to determine the change of the head position based on image data provided by the camera.

13. The apparatus of claim 8 wherein the device is operably coupled to a display.

14. The apparatus of claim 13 wherein the device is further configured to:
   receive first visual data indicative of the first participant and second visual data indicative of the second participant; and
   output the first visual data in a first object and the second visual data in a second object in the display.

15. The apparatus of claim 14 wherein the device is further configured to arrange a position of the first object and a position of the second object in the display based on the acoustic separation of the first participant and the second participant in the virtual acoustic space.

16. The apparatus of claim 8 wherein device includes a control unit configured to control the one or more first filter coefficients based on the first identifier and to control the one or more second filter coefficients based on the second identifier.

* * * * *